(12) United States Patent
Augspurger

(10) Patent No.: US 8,915,015 B1
(45) Date of Patent: Dec. 23, 2014

(54) SOLAR GREENHOUSE

(76) Inventor: Quent Augspurger, Phoenix, AZ (US)

( * ) Notice: Subject to any disclaimer, the term of this patent is extended or adjusted under 35 U.S.C. 154(b) by 218 days.

(21) Appl. No.: 13/135,703

(22) Filed: Jul. 12, 2011

Related U.S. Application Data

(60) Provisional application No. 61/399,785, filed on Jul. 15, 2010.

(51) Int. Cl.
*A01G 9/00* (2006.01)

(52) U.S. Cl.
USPC .................................................. 47/17

(58) Field of Classification Search
CPC ..... A01G 9/1407; A01G 9/1415; A01G 9/16; A01G 9/22; A01G 9/24; A01G 9/245
USPC .......... 47/17, 32.3, 20.1, 30, 32.1, 21.1, 22.1, 47/29.1, 29.2, 29.3, 29.5; 136/243, 244, 136/245, 246, 247, 248, 249, 250, 251, 252, 136/253, 254, 255, 256, 257, 258, 259, 260, 136/261, 262, 263, 264, 265; 49/92.1, 82.1, 49/74.1; 160/11, 44; 62/314, 315
See application file for complete search history.

(56) References Cited

U.S. PATENT DOCUMENTS

| | | | | |
|---|---|---|---|---|
| 2,857,634 A | * | 10/1958 | Garbade et al. ................ | 49/77.1 |
| 3,980,071 A | * | 9/1976 | Barber, Jr. .................... | 126/606 |
| 4,128,307 A | * | 12/1978 | Badertscher et al. ......... | 359/596 |
| 4,219,008 A | * | 8/1980 | Schultz ......................... | 126/592 |
| 4,289,116 A | * | 9/1981 | Williams ....................... | 126/633 |
| 4,443,978 A | * | 4/1984 | Butler ............................... | 52/1 |
| 4,534,335 A | * | 8/1985 | Rice .............................. | 126/631 |
| 4,567,732 A | * | 2/1986 | Landstrom et al. .............. | 62/91 |
| 4,621,588 A | * | 11/1986 | Harris ........................... | 119/241 |
| 4,662,085 A | * | 5/1987 | Russo et al. .................... | 34/105 |
| 4,742,475 A | * | 5/1988 | Kaiser et al. .................. | 700/278 |
| 5,392,611 A | * | 2/1995 | Assaf et al. ....................... | 62/94 |
| 6,134,842 A | * | 10/2000 | Cheng et al. ...................... | 52/1 |
| 2013/0213076 A1 | * | 8/2013 | Gerlach ......................... | 62/314 |

* cited by examiner

*Primary Examiner* — Isam Alsomiri
*Assistant Examiner* — Ebony Evans
(74) *Attorney, Agent, or Firm* — Paul B. Heynssens Attorney at Law PLC

(57) ABSTRACT

A solar greenhouse which may be modular, free-standing or erected against an adjacent structure such as the wall of a building, having s a frame including structural members such as extruded aluminum channels which support a glazing system of transparent or translucent panels. The transparent or translucent panels preferably are opaque to the transmission of infra red light rejected from the solar collector louvers and the interior of the solar greenhouse. Positioned within the solar greenhouse enclosure below the glazed roof or top are a plurality of rotatable solar collector louvers which may be individually positioned or preferably are rotated in unison by a drive system which may be manually controlled or controlled by a software program in a computer or microchip. The louvers are effectively flat plate solar collectors. Water is circulated through the tubular axle of the louvers and is heated by solar radiation when the louvers are in their solar collection positions. The louvers may be adjusted to various positions.

14 Claims, 10 Drawing Sheets

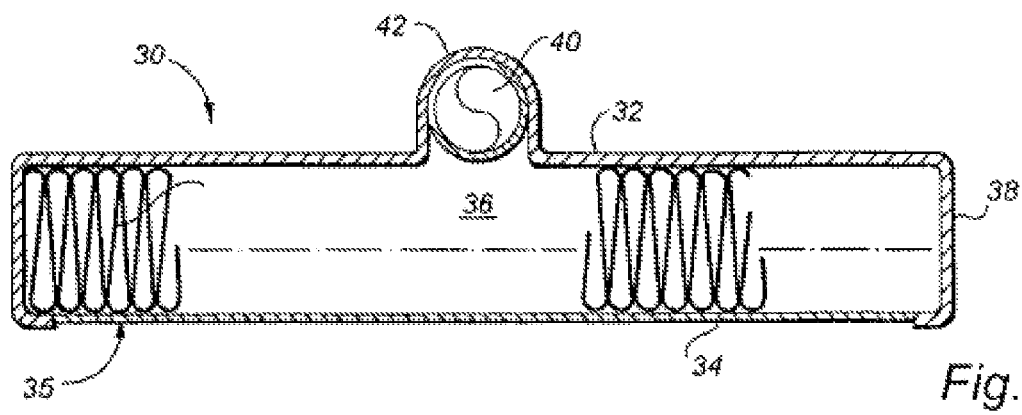
Fig. 2
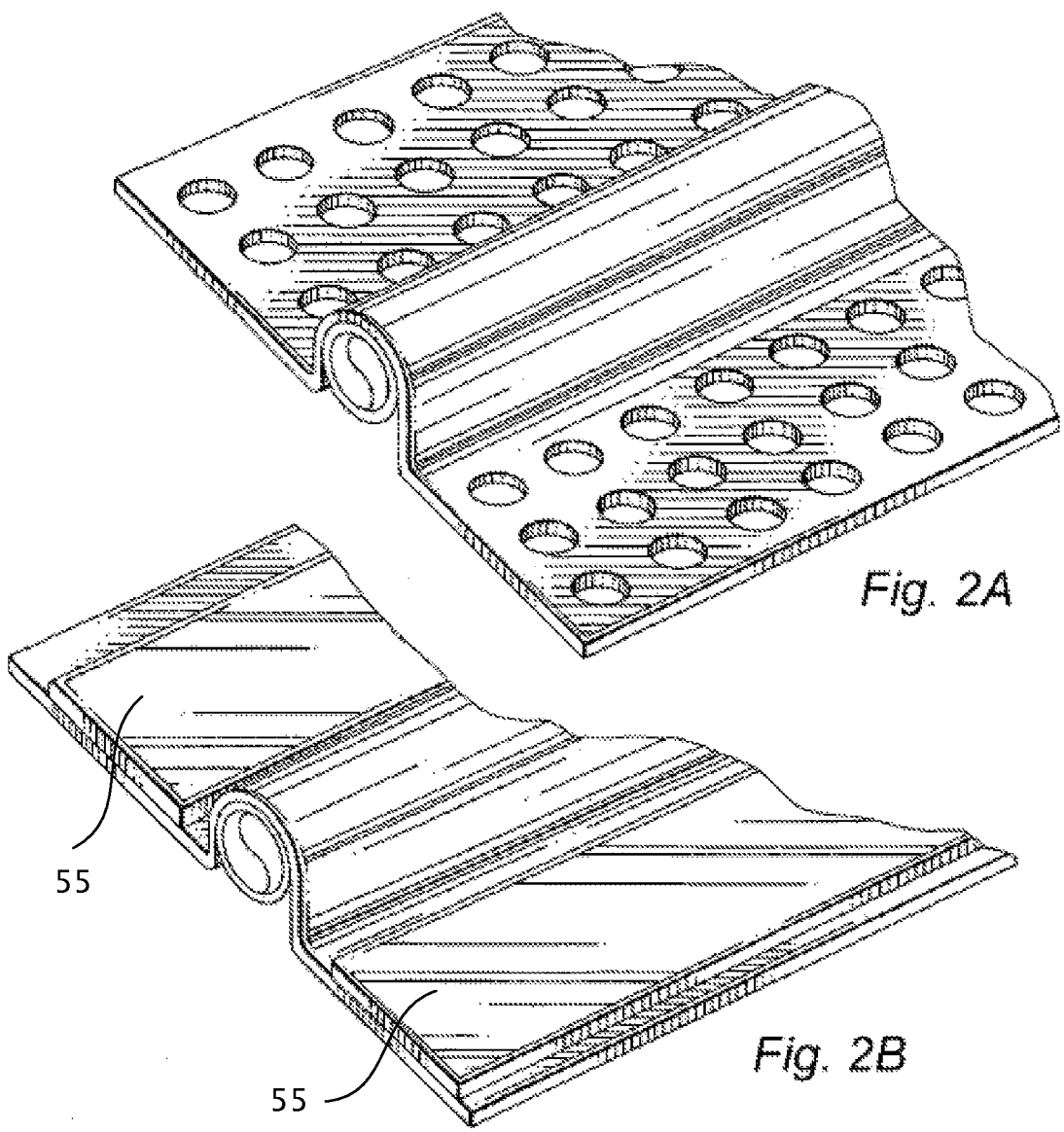
Fig. 2A
Fig. 2B

SOLAR GREENHOUSE

CROSS-REFERENCE TO RELATED APPLICATION

This application claims the benefit of U.S. Provisional Patent Application No. 61/399,785 filed Jul. 15, 2010, the contents of which are hereby incorporated by reference.

FIELD OF THE INVENTION

The present invention relates to a solar structure and more particularly to a solar greenhouse which is provided with adjustable louvers which control light, and operate as solar collectors to generate hot water and also provide radiant heating. The solar greenhouse is also provided with an auxiliary water heater, an evaporative cooler, a fish pond unit and a sink with domestic water supply. The sunlight, temperature, humidity and louver positions within the greenhouse are controlled by various sensors and valving which selectively establish various circuits directing water flow through the louvers for solar collection, through a heat exchanger for pond heating, through the louvers for radiant space heating or alternatively, or in combination, through the baseboard heat exchanger for radiant space heating.

BRIEF SUMMARY OF THE INVENTION

Briefly, the present invention provides a solar greenhouse which may be modular, free-standing or erected against an adjacent structure such as the wall of a building. The greenhouse is oriented to receive substantial daylight and in the colder climates would generally be oriented facing south. The greenhouse has a frame including structural members such as extruded aluminum channels which support a glazing system of transparent or translucent panels of glass or other light transmissive materials forming one or more sidewalls, an inclined roof and end walls. The end walls may be provided with doors for suitable ingress and egress. The transparent or translucent panels preferably are opaque to the transmission of infra red light rejected from the solar collector louvers and the interior of the solar greenhouse. Positioned within the solar greenhouse enclosure below the glazed roof or top are a plurality of rotatable solar collector louvers which may be individually positioned or preferably are rotated in unison by a drive system which may be manually controlled or controlled by a software program in a computer or microchip. Preferably the drive system utilizes a series of helical sprockets associated with the louvers which are in driven relationship with a roller chain coupled to an actuator.

The louvers are effectively flat plate solar collectors having a white or light colored finish on one surface and a flat black finish on the opposite surface. A water line extends axially through or along a surface of each louver and is coupled to the water line of the next adjacent louver to form a solar water heating system or network running along or through the louvers. Each water line being tubular also serves as an axle to support the rotational positioning of the louvers. Water is circulated through the tubular axle of the louvers and is heated by solar radiation when the louvers are in their solar collection positions. The louvers may be adjusted to various positions from a full daylight position with minimum solar collection to a minimum daylight entry position with maximum solar collection or to a nighttime radiation position in which heat collected during the day is rejected to the interior of the greenhouse.

An alternative to the previously described louver construction is a louver with photovoltaic cells applied to the black side, so that in addition to acting as a heat absorbing surface, the photovoltaic surface will convert sunlight into electricity that can be used to supplement electricity required to operate equipment in the greenhouse or for another use.

The solar greenhouse may be provided with features such as adjustable shelving for support and containment of plants and various other items. A gas or electric water heater is available for heating water on demand when available solar heating is insufficient. The solar greenhouse enclosure is primarily heated by hot water circulated from a hot water storage tank through the tubular axles in the louvers which radiate heat to the interior of the solar greenhouse or alternatively, or in combination with the louvers, the hot water is circulated through heat exchangers such as baseboard heat exchangers. Cooling may be supplied by an evaporative cooler unit. An open fish pond unit provides both humidity and heating to the interior of the solar greenhouse. Cold water is available from a suitable source to supply a sink and the evaporative cooler.

BRIEF DESCRIPTION OF THE DRAWINGS

The above and other advantages and objects of the present invention will become more apparent from the following description, claims and drawings in which:

FIG. 2 is a cross-sectional view of a representative louver;

FIG. 2A shows an alternative louver design where the louver is constructed of a flat perforated sheet of metal preferably aluminum;

FIG. 2B shows yet another louver design in which one or more louvers are provided with solar cells on their black surface;

DETAILED DESCRIPTION OF THE DRAWINGS

Figure 1:
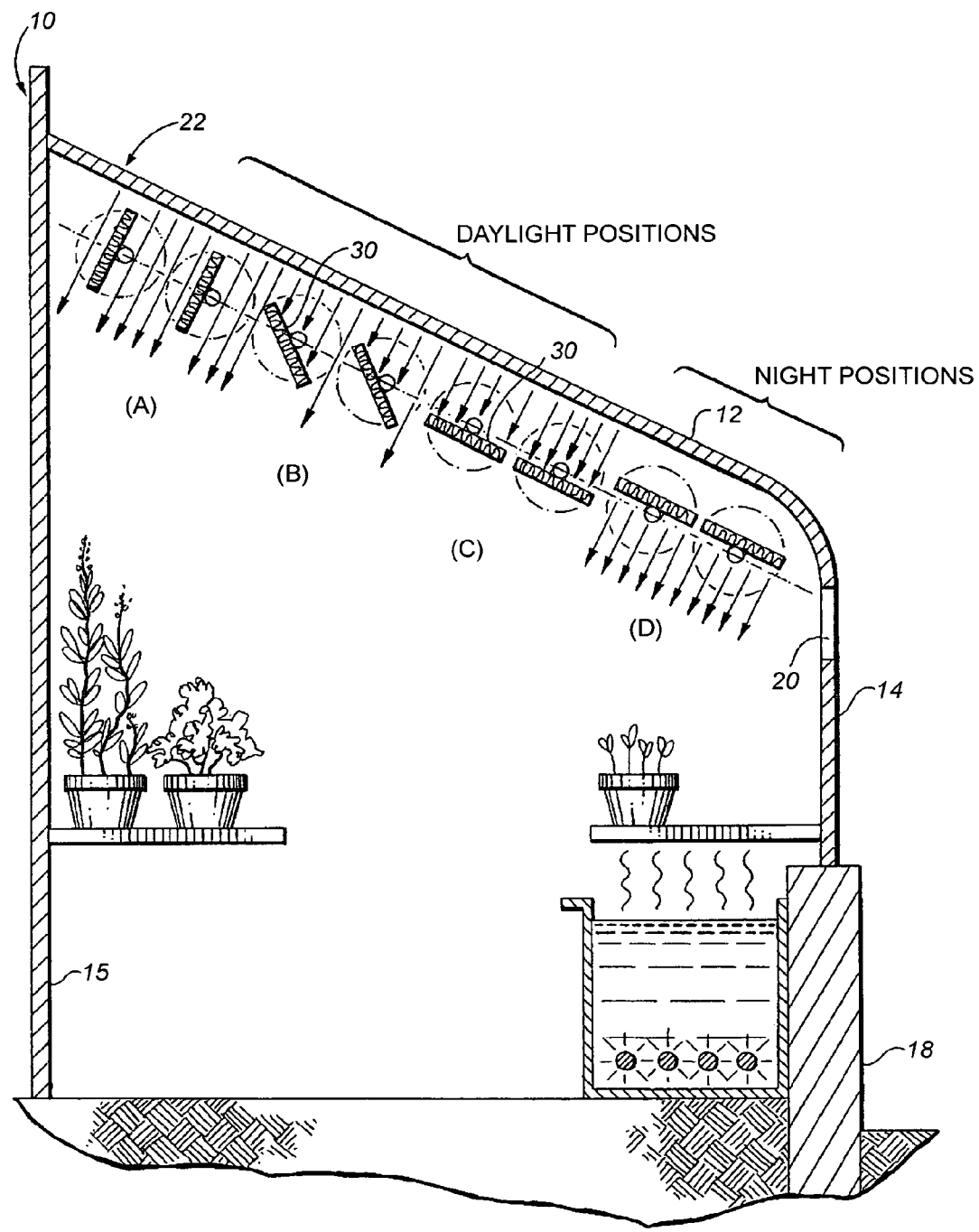
FIG. 1 is a vertical cross-section viewed through the solar greenhouse according to the present invention showing the flat plate solar collector louvers in various positions designated A, B, C and D.

Turning now to the drawings, FIG. 1 is a vertical cross-sectional view showing the interior of the solar greenhouse according to the present invention. As seen, the solar greenhouse which is generally designated by the numeral 10 has an inclined light transmissive glazed roof 12 and a vertical sidewall 14. The opposite ends of the greenhouse are enclosed by end walls, not shown. One or both end walls may be provided with a suitable door for convenient ingress and egress.

The solar greenhouse 10 may be free-standing in which case would have a sidewall and opposite sidewall 14 or may be secured to an adjacent structure such as a wall 15 of a structure such as a building, as shown in FIG. 2. The roof 12, sidewall 14 and end walls incorporate structural members 20 preferably of extruded aluminum suitably coated for durability forming supports for a plurality of glazed panels 22 such as transparent or translucent glass which will allow the passage of incoming solar energy, but are opaque to the passage of infra red radiation emitted from within the solar greenhouse. The overall dimensions of the solar greenhouse 10 may vary dependent upon the users requirements.

Similarly, the size of the individual glazed panels may vary. The basic solar greenhouse structure 10 may be a custom design or may be a commercially available unit such as the Janco lean to style glass and powder coated aluminum greenhouse modified to incorporate the features of the present invention as will be described below. The sidewalls 14 may extend to the foundation floor or may be supported on a retaining wall 18 as shown in FIG. 2.

Figure 3:
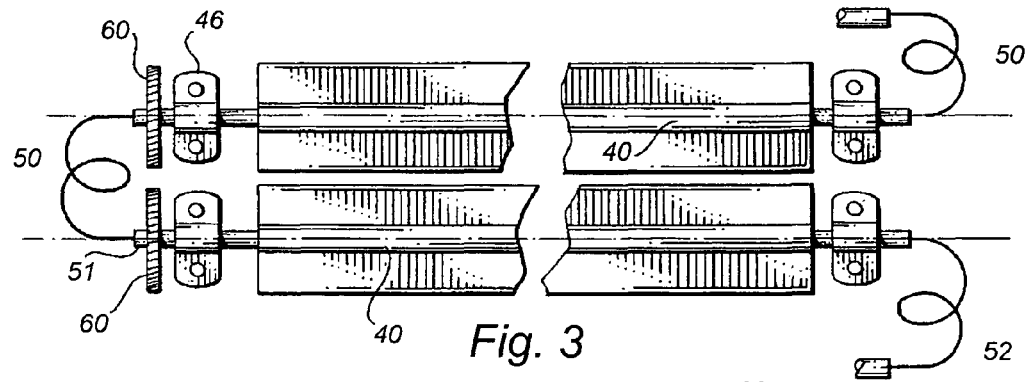
FIG. 3 is a top view showing two adjacent louvers and the interconnection of the fluid lines between the adjacent louvers which establish a system for solar water and radiant heating.

Disposed below the inclined glazed roof 12 are a plurality of rotatably positionable flat plate solar collector louvers 30, as seen in detail in FIGS. 1, 2 and 3. In FIG. 1, eight solar collector louvers 30 are shown, but any suitable number may be used depending on factors such as location, greenhouse size, environment and orientation. The louvers 30 are each fabricated from a suitable heat conductive material such as aluminum. Each of the louvers has opposite surfaces 32, 34 which may be flat or may be slightly curved and which define a louver body 35. The body 35 of each louver has a hollow core 36 enclosed by opposite end caps 38. The hollow core of the body of the louver is filled with a suitable insulation 39 such as a rigid or expanded foam insulation. One surface 32 of the louver is heat-absorbent and is coated with a dark covering such as a flat black powder coating. The opposite surface 34 is a non-heat absorbing surface and may be polished aluminum or a suitable white or light colored paint or powder coat finish.

As seen in FIG. 2A, the louvers 30 may also be perforated preferably fabricated from a flat sheet of metal such as aluminum. The size and number of the perforations 31 are selected in accordance with the particular application. The perforations allow some sunlight to pass through the perforations. For example, if the perforations comprise about 30% of the surface area of the louvers 30, about 30% of the incident sunlight will be able to pass through the louvers 30 when in the closed position. This provides a method of controlling the maximum amount of sunlight entering the interior of the solar greenhouse when the louvers are closed.

The louvers 30, as seen in FIG. 2B, may also be provided with photovoltaic cells 55. The individual cells 55 are located on the black surface 32 and are coupled to cells on the surface of other louvers to form a solar array. The electrical connection between the cells on the rotatable louvers include a slip ring or a rotating connector. The output of the solar array is coupled to an electrical energy storage device which may consist of or include a storage battery and the energy may be used to provide power to electrical components such as pumps, lighting and other components.

Tubes 40 extend axially along each louver and each is secured to the absorbent black side 32 of the associated louver by a suitable bracket or sleeve 42 which may be integrally formed with the louver surface. A suitable heat transfer medium is used in the clearance gap between the tube 40 and the louver 32. The tubes and the louvers rotate as integral units in bearing blocks 46 at opposite ends of the louvers.

The tubes 40, which are axles for the louvers supporting the louvers' rotation, are hollow and preferably are copper and also serve as conduits for water which flows through the louvers in a heating system or network. As seen in FIG. 3, the ends of the conduits extending from adjacent louvers are interconnected by a suitable connection such as flex hose 50 and rotating couplings 51 so that each row of louvers can rotate freely and permit water to flow sequentially through the louvers from the inlet 52 to the outlet 54 at the discharge end of the last louver in the louver network system. The louvers are shown adjacent one another and in positions C and D of FIG. 1. The louvers are dimensioned so the side edges of adjacent louvers are closely adjacent when in a maximum solar collection position (position C of FIG. 1) or in a space heating position to minimize heat loss (position D of FIG. 1).

Figures 4, 5:
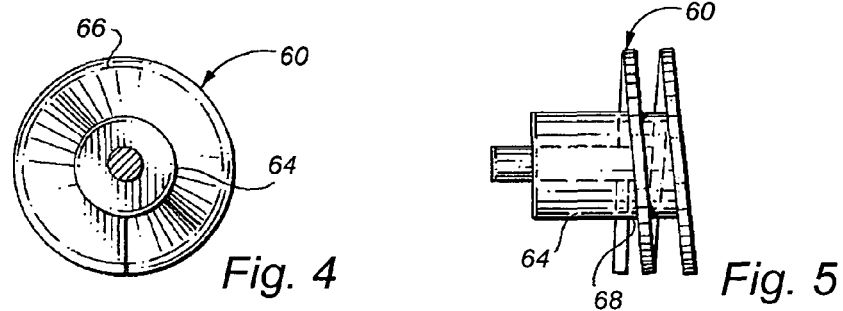
FIG. 4 is a plan view of one of the drive sprockets used in a system to simultaneously position all the louvers.
FIG. 5 is a side view of the sprocket showing the previous view.
Figure 6:
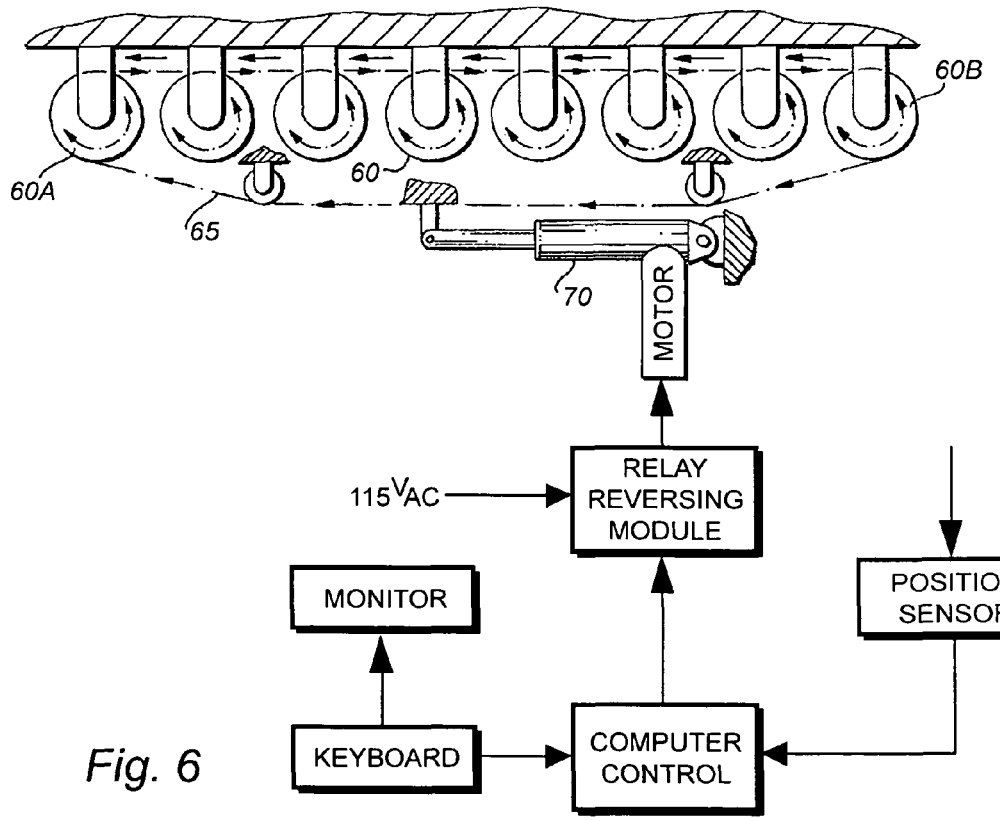
FIG. 6 is a view illustrating a series of adjacent drive sprockets and their interconnection which allows them to be simultaneously positioned by a single drive chain and actuator.
Figure 7:
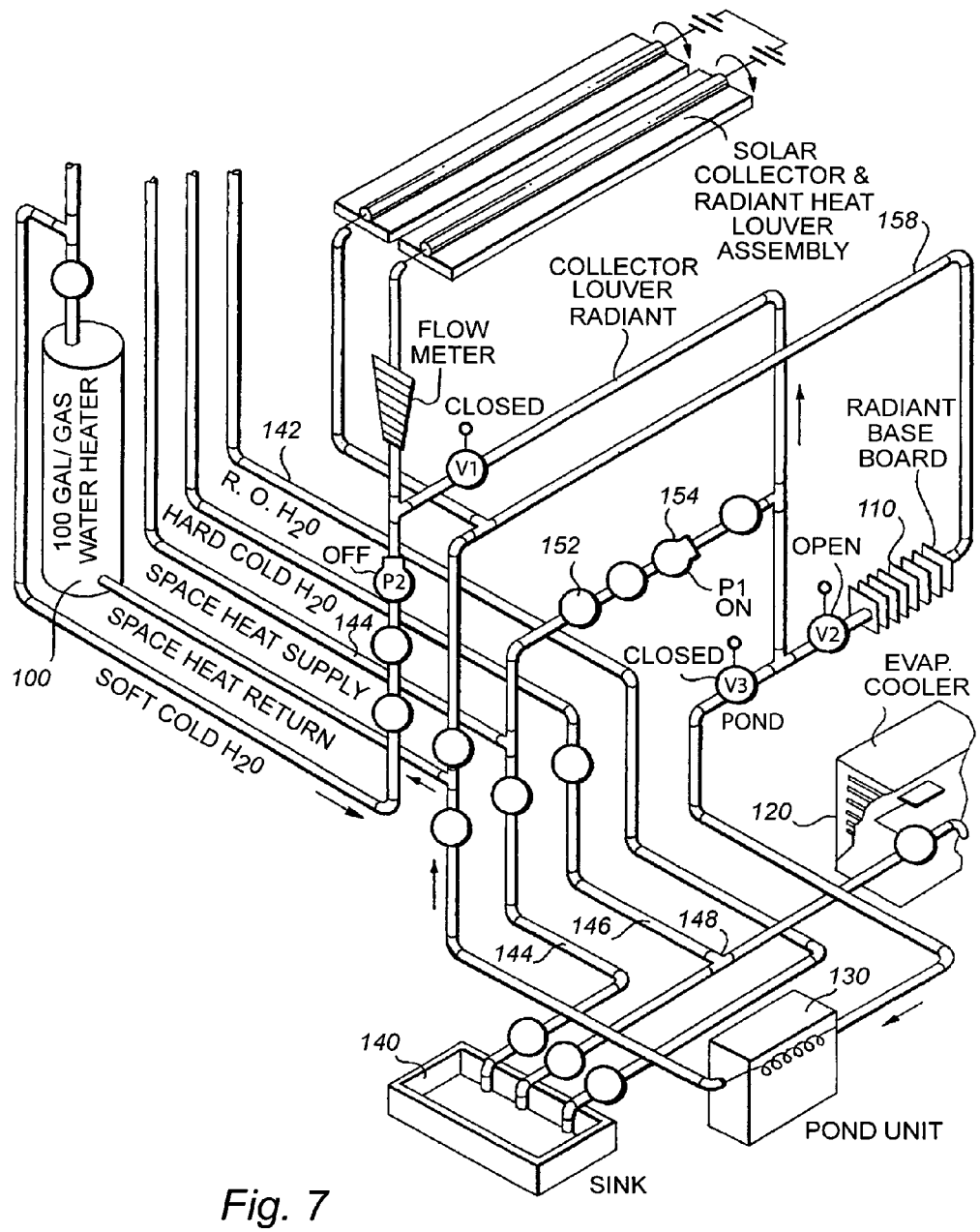
FIGS. 7 to 10 are schematic flow diagrams showing operation of the system in the solar heating mode, pond heating mode and radiant heating baseboard mode of operation.

One end of each louver tube 40 carries a sprocket 60. A sprocket 60, is best seen in FIGS. 4 and 5. The design of the drive mechanism or system, as seen in FIG. 6, embodies a helical sprocket which allows a connecting drive chain 65, such as a conventional roller chain, to wrap around each sprocket 60 in the drive train. This helical sprocket system allows a number of the louvers to be adjusted and positioned simultaneously in unison by a single actuator such as a linear actuator 70 or a stepping motor.

Each of the helical sprockets 60 has a hub with a bore 64 which receives one end of the louver tube and is secured by a setscrew or by frictional fit. Each sprocket has a plurality of teeth 66 shown as having a suitable profile which cooperates with the drive chain 65. The sprockets 60 are helical with a pitch that results in sufficient space 68 between the adjacent edges of the sprocket, as shown in FIG. 5, to provide suitable clearance for the roller chain to pass, without interference, as shown in the chain diagram of FIG. 6. The hub and sprocket can be any suitable material but it is preferred that the sprocket be a durable non-corrosive material such as high strength plastic, stainless steel or bronze. The end sprockets 60A, 60B have flat or planar sprockets allowing the chain to partially wrap around the end sprockets.

Figure 11A:
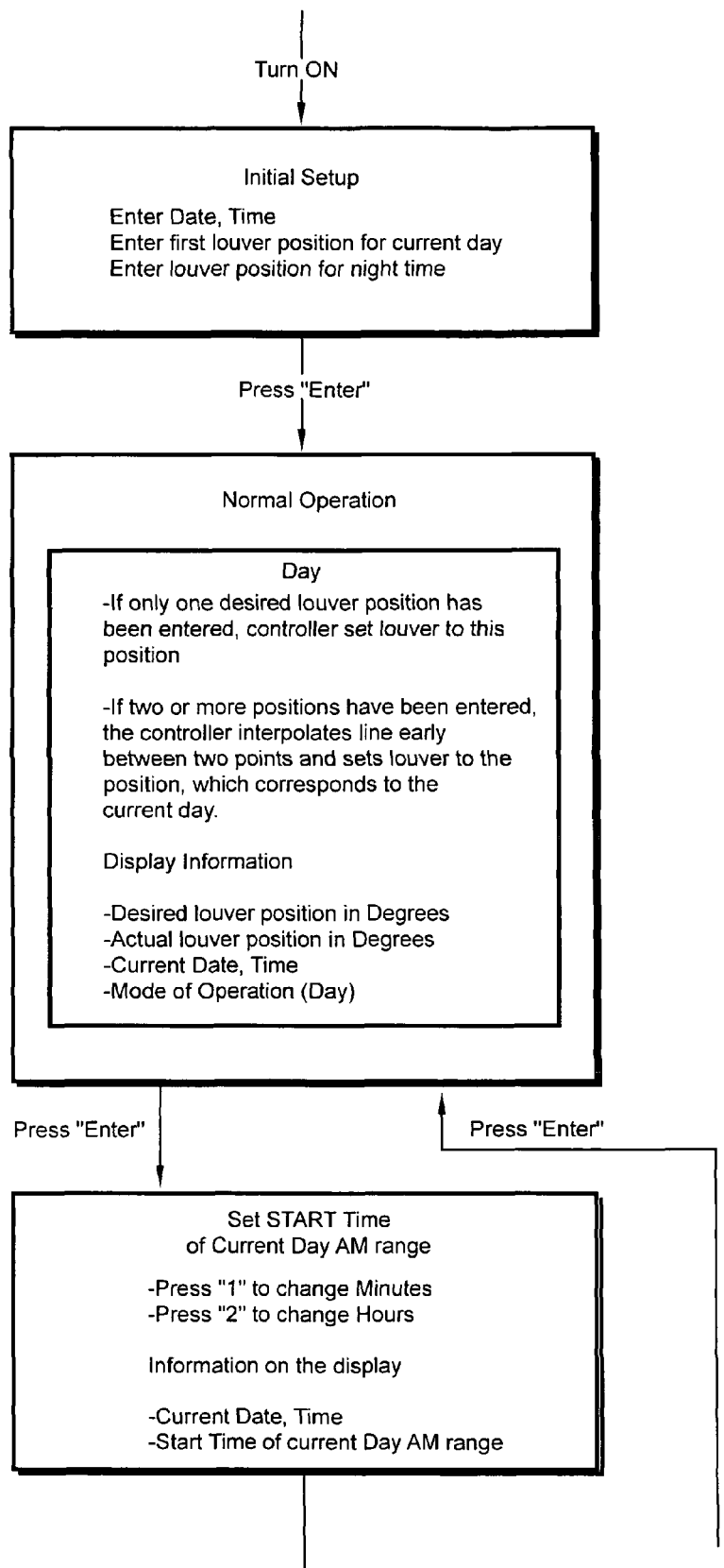
FIGS. 11a-11c shows the steps or flow diagram for programming the operation and positioning of the louvers.
Figure 11B:
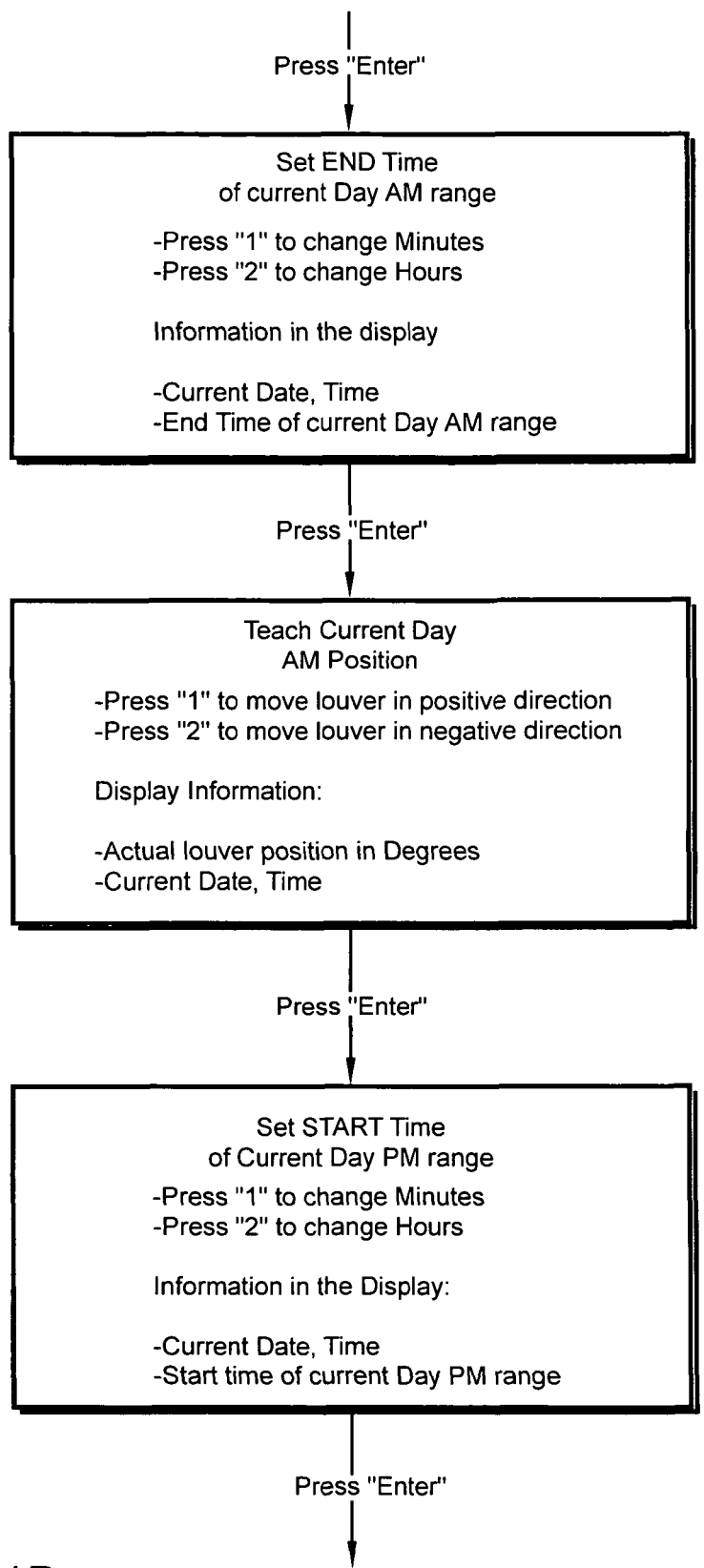
Figure 11C:
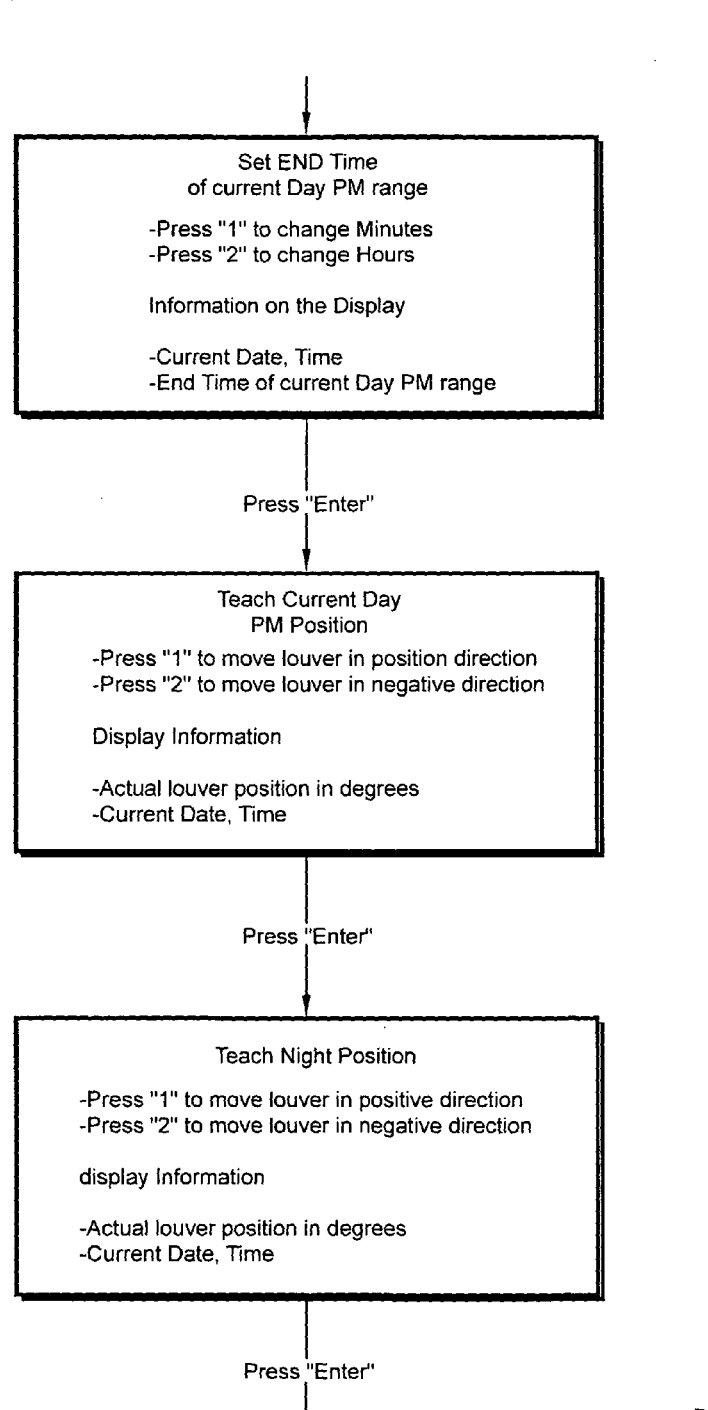

The actuator 70, shown as a linear actuator bi-directionally operable and will simultaneously rotate all of the louvers on the chain to the same position. The actuator may be manually controlled or controlled from suitable sensors which are programmed based on environmental parameters such as light and or temperature conditions or the like. The actuator may also be controlled from an electronic control circuit which may include a computer or microchip which is programmed to provide the desired greenhouse condition based on environmental parameters. FIG. 6 shows such an arrangement with the programmable controller identified by the numeral 72 which includes a position sensor 73, reversing relay 74, computer 75 and input keyboard 76. FIGS. 11a-11c illustrate a programming sequence that may be used to establish the position of the louvers during a period such as 24 hours.

Turning now to FIG. 1 which shows the various lover positions as follows:
 (A) Full daylight, minimum solar collection;
 (B) Partial daylight, partial solar collection;
 (C) Minimum daylight, maximum solar collection; and
 (D) Nighttime radiation space heating The solar greenhouse 10 houses a number of components to support and encourage plant propagation. A conventional water heater 100, such as a 100 gallon gas or electric water heater, may be housed either internally within the solar greenhouse 10 or at a convenient nearby location. Radiant heating is provided by either the louvers or the baseboard heaters 110 extending along one or more walls of the solar greenhouse. An evaporative cooler 120, an open fish pond 130 and a sink 140 are also conveniently located within the solar greenhouse preferably along the walls so that the clear pathway is provided down the center of the greenhouse.

The piping and flow control systems are shown in schematic form in FIGS. 7 to 10 in several operational modes. Purified water, such as water from a reverse osmosis unit, is supplied to the sink 140 via line 142. Hot and cold water is also supplied to the sink via lines 144 and 146. Tee 148 in line 144 also directs water to the evaporative cooler 120. Water from water heater 100 may be directed, via line 144, to the radiant heating baseboards by valve 162 and pump 154. Water returning from the radiant heating baseboards is coupled via a return line 163 to the water heater.

Figure 8:
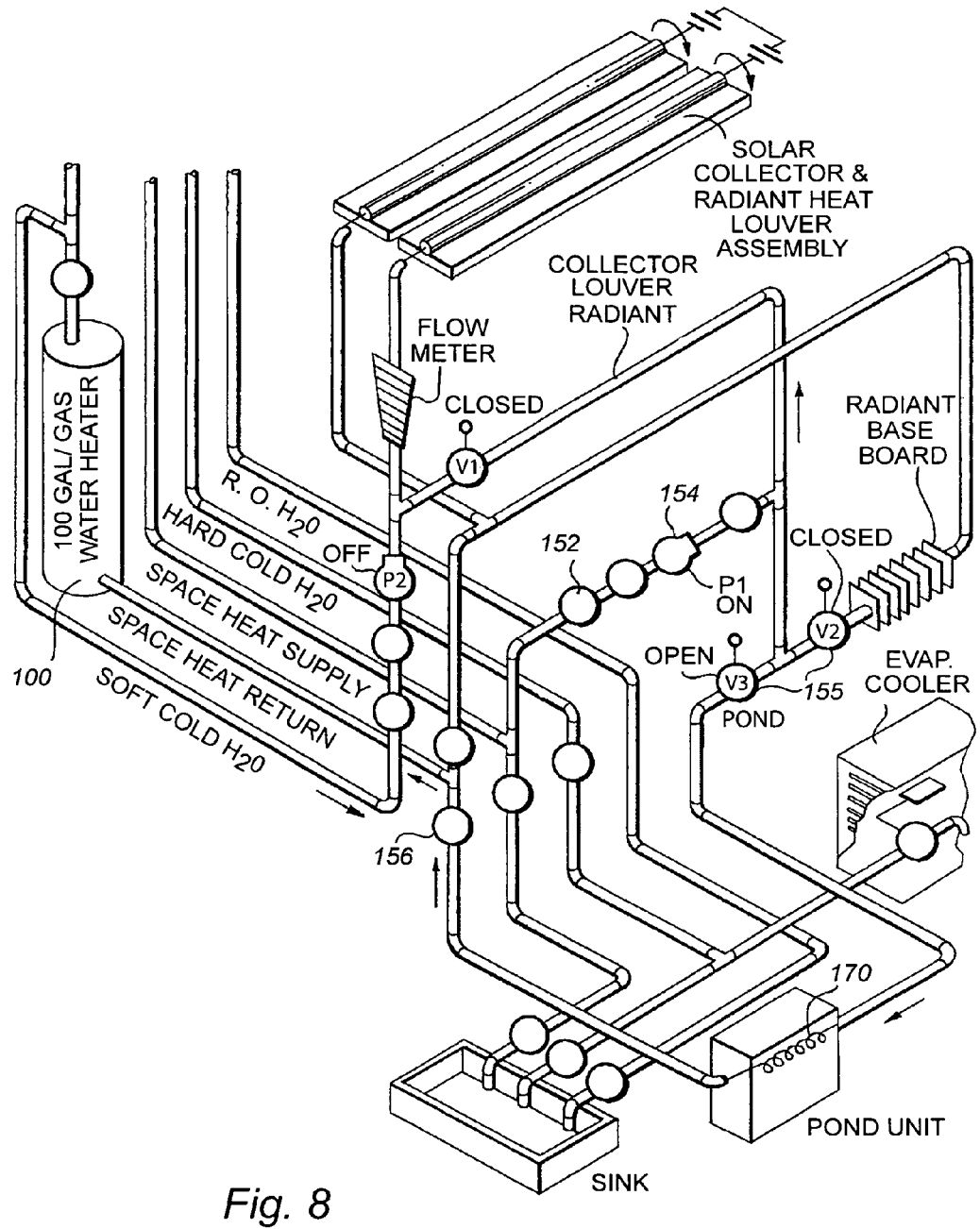
Figure 9:
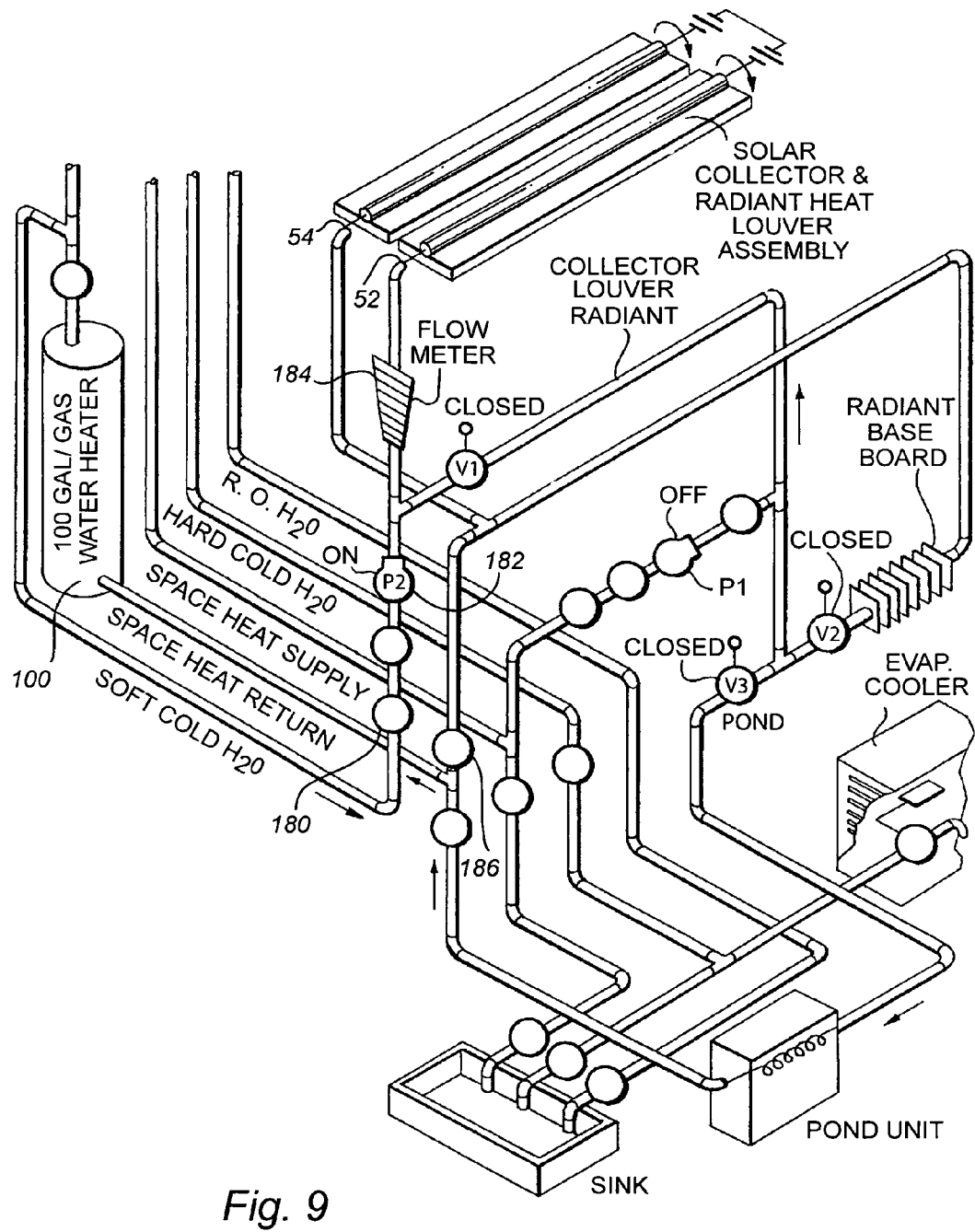

Referring to FIG. 8, fish pond-heating water is supplied from the heater 100 to heat exchange coil 170 in the pond unit across valves 152, 155 and 161 by pump 154 and returned to the space heater. Hot water circulated through the louver assembly 32 is supplied to the space heater 100 as seen in FIG. 9, during periods when the louvers are in a solar collecting position as seen in FIG. 1. The water passes across valve 180, pump 182, flow meter 184 and valve 186. The space heater is operated using gas, oil or electric fuel when the solar heating is insufficient.

Figure 10:
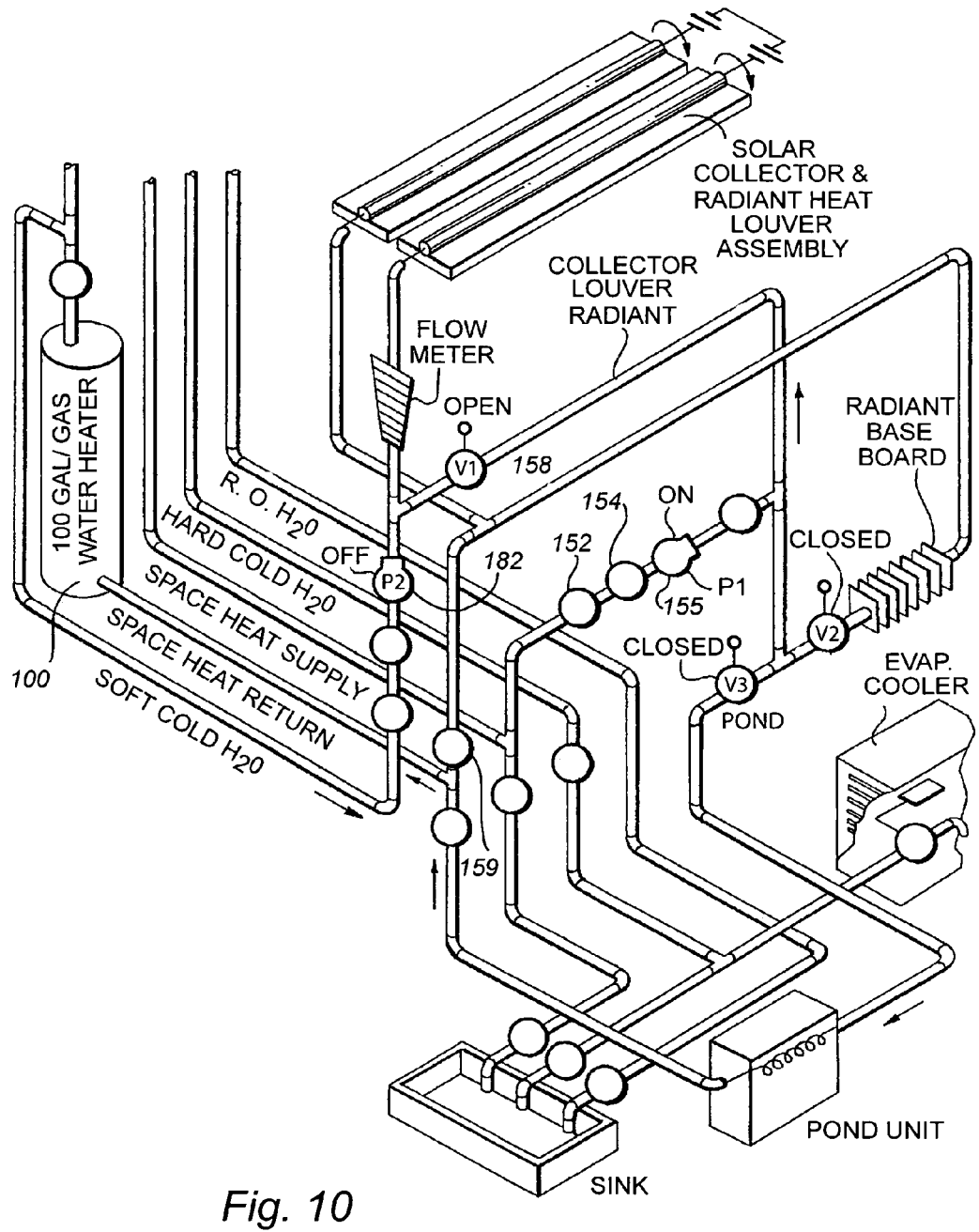

In FIG. 10, the louvers are in the nighttime radiation position shown in FIG. 1. Hot water from the heater 100 is supplied to the louvers and returned to heater 100 across valve 152, pump 154, valve 155, valves 158 and 159. The louvers will radiate heat into the enclosure.

The system is controlled by various sensors. Interior thermostats $T_1$ are settable to control the operation of the space heating louvers 32 and/or the radiant baseboards heater 110 by opening and closing valves 161 and 162 to maintain the appropriate setting. The evaporative cooler is controlled by a thermostat $T_2$ which turns the fan motors on or off to maintain appropriate setting. Humidity is supplied by the fish pond and by the operation of the evaporative cooler. A humidistat H may also be set to a desired humidity level and operate a valve coupled to the reverse osmosis water supply line to initiate a spray or fog system to increase the humidity level within the solar greenhouse. The spray nozzles are fog emitters suitably placed within the solar greenhouse.

The fish pond unit will also provide humidity to the interior of the solar greenhouse as the fish pond unit is an open pond. The fish pond water is maintained at a suitable level by float valve coupled to either/or the potable or the reverse osmosis water supply.

An important feature of the solar greenhouse is the rotating flat plate solar collector louvers. As described above, the louvers are positionable in various positions A, B, C and D by a drive mechanism or system. As seen in FIG. 1, position A is a full daylight position which will admit maximum light to the interior of the solar greenhouse. In this position, minimum solar collection occurs. When the louvers are rotated to position B, this is a daylight and partial solar collection position. Some light is blocked by the position of the louvers and, in this position, the side of the louvers with the flat black finish are partially oriented to receive solar radiation. In the C position, as shown in FIG. 1, minimum daylight is allowed to pass the louvers as the louvers are in a light-blocking position. Again, the flat black finish is disposed upwardly so that maximum solar collection occurs in this position during daytime. The nighttime radiant space heating position is shown as position D. In this position, the louvers have been rotated $180_C$ from the C position and the white light colored finish surface is disposed upwardly. Again, the louvers are aligned in a light-blocking position.

The solar collector louvers provide three functions: 1. The louvers control the amount of sunlight entering the solar greenhouse; 2. The louvers collect solar energy to heat water stored in the 100 gallon domestic hot water storage tank; and 3. The louvers provide radiant heating at nighttime for heating the solar greenhouse. During the nighttime period, water that has been heated by solar radiation can also be directed from the water tank to the radiant baseboards for heating. During cooler periods in which the heat collected in the water storage tank is insufficient, the water storage tank may be heated by gas or electricity, as described above.

The fish pond unit provides water for nutrients for plants such as orchids, as well as providing some additional humidity. The tank will support fish whose waste products provide the nutritional elements for plant nourishment.

The motorized louvered vents 125, which are controlled by interlocked relays, allow evaporative cooled air to exit the solar greenhouse. When the evaporative cooler is off, the vents close and ceiling fans provide air circulation. The reverse osmosis system provides a water supply for the misting system when humidity drops below a level set on the humidistat.

It will be obvious to those skilled in the art to make various changes, alterations and modifications to the invention described herein. To the extent such changes, alterations and modifications do not depart from the spirit and scope of the appended claims, they are intended to be encompassed therein.

The invention claimed is:

1. A solar greenhouse comprising:
a structure defining an enclosure, the structure having a plurality of light transmissive panels;
a plurality of rotatable positionable louvers disposed adjacent at least one of the plurality of light transmissive panels, the plurality of louvers having a reflective surface and an opposite absorbent surface, the plurality of louvers having a water circulating line extending axially along the absorbent surface coupled to a water line of adjacent plurality of louvers establishing a water system, the water line extending from each louver and forming an axle supporting rotation of the louver;
a drive system for positioning the plurality of louvers in various positions with the surfaces selectively positioned for solar collection, radiant space heating, day lighting, the drive system including a helical sprocket about which a connecting drive chain is wrapped so that a number of the plurality of louvers may be simultaneously actuated; and
the water circulating system interconnected to provide heated water to a storage tank.

2. The solar greenhouse of claim 1 wherein the storage tank communicates with a radiant baseboard heat exchanger in the greenhouse enclosure.

3. The solar greenhouse of claim 1 wherein the water line extends generally along the length of the plurality of louvers and are mounted in bearings to support rotation of the plurality of louvers.

4. The solar greenhouse of claim 1 wherein the plurality of louvers are perforated.

5. The solar greenhouse of claim 1 wherein a surface of the plurality of louvers are provided with photovoltaic cells electrically coupled to a storage battery.

6. The solar greenhouse of claim 1 further including an evaporative cooler and a water pond, the water pond having a heat exchanger coupled to selectively receive heated water from the storage tank unit.

7. A solar greenhouse comprising:
a structure including a plurality of transmissive panels;
a plurality of louvers disposed adjacent to some of the plurality of transmissive panels on an interior of the structure, in which each of the plurality of louvers have a first louver side with a reflective surface, a second louver side with an absorbent surface and an axial water line forming an axle about which each of the plurality of louvers may be rotated;
a drive mechanism for simultaneously adjusting the position of each louver of the plurality of louvers depending upon environmental conditions, the drive mechanism including a helical sprocket about which a connecting drive chain is wrapped so that a number of the plurality of louvers may be simultaneously actuated; and
a circulation system coupled to each axial water line of each of the plurality of louvers so that heat may be retained in a storage reservoir.

8. The solar greenhouse of claim 7 in which the second louver side further comprises photovoltaic cells disposed thereon.

9. The solar greenhouse of claim 7 in which the water line is formed from a tube disposed upon the second louver side.

10. The solar greenhouse of claim 7 in which the water line is integrally formed into the louver.

11. The solar greenhouse of claim 7 in which the drive mechanism is controlled by an electric control circuit to control a position of each of the plurality of louvers depending upon environmental parameters.

12. The solar greenhouse of claim 7 further comprising an evaporative cooler coupled to an electronic control circuit that aids in maintaining thermostatic control of the structure.

13. The solar greenhouse of claim 7 further comprising a humidistat coupled to the system so that humidity in the structure may be controlled.

14. The solar greenhouse of claim 13 further comprising a spray system controlled by an electronic control system so that humidity may be adjusted in the structure.

* * * * *